United States Patent
Widdershoven

[15] 3,675,509
[45] July 11, 1972

[54] STEPLESSLY VARIABLE SPEED CHANGER

[72] Inventor: Louis Hubertus Widdershoven, Kerkrade, Netherlands

[73] Assignee: N. V. Nederlandsche Steenkolenmijnen"-Willen-Sophia," , Spekholzerheide (Kerjrade-West), Netherlands

[22] Filed: Aug. 5, 1970

[21] Appl. No.: 61,182

[52] U.S. Cl. .......................................................... 74/793
[51] Int. Cl. .......................................................... F16h 3/44
[58] Field of Search ................................................. 74/793

[56] References Cited

UNITED STATES PATENTS

| | | | |
|---|---|---|---|
| 3,374,691 | 3/1968 | Schottel | 74/793 |
| 3,051,022 | 8/1962 | Way, Jr. | 74/793 |
| 3,087,355 | 4/1963 | Bassereau | 74/793 |
| 3,130,606 | 4/1964 | Kreis | 74/793 |
| 3,363,482 | 1/1968 | Case | 74/793 |

FOREIGN PATENTS OR APPLICATIONS

| | | | |
|---|---|---|---|
| 995,305 | 6/1965 | Great Britain | 74/793 |

Primary Examiner—C. J. Husar
Attorney—Herzig & Walsh

[57] ABSTRACT

The invention is a steplessly variable or adjustable speed transmission for varying the ratio of speed of drive from one shaft to another. There is a planetary system which includes a sun gear on the output shaft. There are four planetary gears equally spaced around the shafts which are driven in circular orbits around the shafts. Carried also by the planetary system are additional gears providing driving relationships between the planetary gears and the sun gear. On the shafts of the planetary gears are grooved drive pulleys. Flexible lines or belts attached at their ends are wrapped around the pulleys. When the input shaft drives the pulleys in their orbits, the pulleys have traction with the belts so that the pulleys are driven about their axes and through the planetary gear trains they drive the sun gear on the output shaft. The shafts of the planetary gears which also carry the grooved pulleys are carried by eccentric wheels or discs which are rotatable so that the radial distance of the grooved pulleys from the center line of the input and output shafts can be varied, for changing the speed ratio.

17 Claims, 16 Drawing Figures

INVENTOR
LOUIS HUBERTUS WIDDERSHOVEN
BY Herzig & Walsh
ATTORNEYS

INVENTOR
LOUIS HUBERTUS WIDDERSHOVEN
BY Herzig & Walsh
ATTORNEYS

INVENTOR
LOUIS HUBERTUS WIDDERSHOVEN
BY
Herzig & Walsh
ATTORNEYS

INVENTOR
LOUIS HUBERTUS WIDDERSHOVEN
BY Herzig & Walsh
ATTORNEYS

INVENTOR.
LOUIS HUBERTUS WIDDERSHOVEN
BY Herzig & Walsh
ATTORNEYS

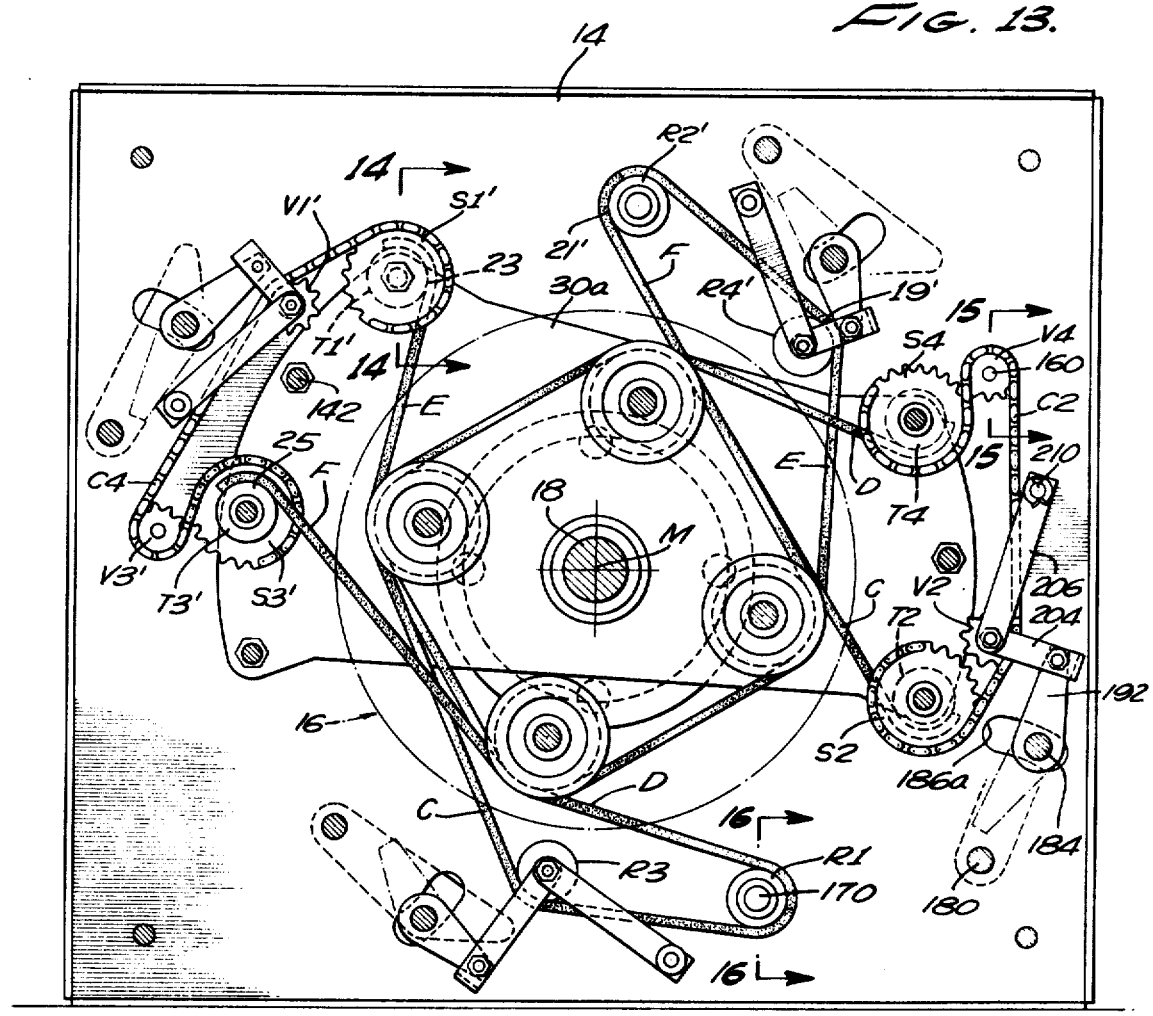
FIG. 13.
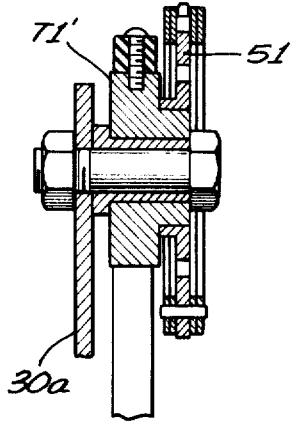
FIG. 14.
FIG. 15.
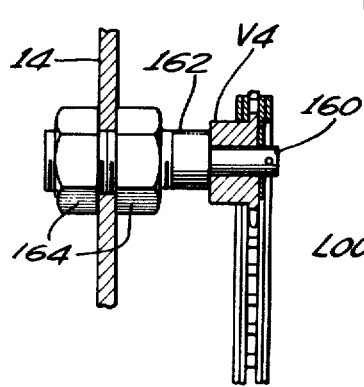
FIG. 16.
INVENTOR
LOUIS HUBERTUS WIDDERSHOVEN
BY
Herzig & Walsh
ATTORNEYS

STEPLESSLY VARIABLE SPEED CHANGER

SUMMARY OF THE INVENTION

The invention is a mechanism or machine for providing stepless variation or adjustment in the ratio of drive as between one shaft and another, such as an input shaft and an output shaft. Various types of devices are known in the art in the form of transmissions between a driving member and driven member, whereby the driven member may be driven at a different speed than the driving member. Typically, transmissions of this type as known in the art have the capability of being set to one of a limited number of different driving ratios. In other words, the change in adjustment from one speed to another is typically, a step change. The herein invention provides a machine or mechanism which is a transmission or speed changer having the capability that the ratio of change or difference in speed can be varied steplessly as desired over a considerable range. The primary object of the invention is to provide and make available a transmission or speed changer achieving this capability.

A preferred exemplary form of the invention is described in detail herein. More specific objects of the invention will be understood and appreciated from the following preliminary outline of the nature of the mechanism of the invention.

The input and output shafts are aligned. The input shaft drives a planetary system which, through gear trains, drives a sun gear on the output shaft, the ratio as between speed of the input and output shafts being steplessly variable. The input shaft drives an assembly, including a plurality of planetary gears which mesh with idler gears providing for drive between the planetary gears and the sun gear on the output shaft. The planetary gears and the idler gears are driven in circular orbits by the input shaft.

On the ends of the shafts of the planetary gears, of which preferably there are four, equally angularly spaced are grooved drive pulleys. Preferably, the pulleys have multiple grooves. Wrapped around the groups of pulleys at the ends of the planetary gear shafts re flexible belts fastened at their ends. When the grooved pulleys are driven through their orbits, there is frictional traction between the grooved pulleys and the belts which drives the grooved pulleys about their axes, and thus the planetary gears are similarly driven, and through their gear trains, they drive the sun gear on the output shaft.

The shafts of the planetary gears and the pulleys are carried by discs which discs are on the same shafts that carry the idler gears. That is, the planetary gear shafts are eccentrically carried by these discs. By rotating the discs, the grooved pulleys can be moved closer to or farther from the center line of the input and output shafts. That is, the radius of the orbits of the grooved pulleys can be changed. When the size of the orbits is changed, the pulleys nevertheless remain in tractive engagement with the flexible belts to be similarly driven. Thus, it is seen that the drive to the output shaft can be steplessly varied as to the ratio of speed because the size of the orbits of the grooved pulleys determines the number of rotations imparted to the grooved pulleys during one orbit.

Preferably, each of the two sets of four pulleys has four grooves with which the belts engage. The belts being fastened at their ends, each belt at any given time engages less that all of a group of four of the pulleys, but all pulleys are at all times engaged with sufficient sections of belt to insure positive frictional traction and uniformity of traction and drive of the pulleys, and means are provided to equalize and maintain uniformity of tension in all belts as will be described in detail hereinafter.

In the light of the foregoing, the further additional objects will be well understood and appreciated.

A further object is to provide a mechanism of the type referred to, wherein an input shaft drives a planetary system including planetary drive wheels or pulleys which engage and have traction with flexible means whereby to drive the pulleys and to in turn drive gear trains meshing with the sun gear on an output shaft.

Another object is to provide a machine or mechanism as in the foregoing wherein the driving wheels or pulleys are mounted on eccentric disc members, so that the drive wheels or pulleys can be adjusted toward and away from the center line of the input and output shafts, while remaining in traction engagement with the flexible means whereby the ratio of speed of drive can be steplessly varied.

Another object is to provide a machine or mechanism as in the foregoing wherein the drive wheels are in the form of drive pulleys having multiple grooves, there being flexible belts wrapped around and engaging with the grooved pulleys to provide for traction drive, the belts being fastened at their ends and provided with means to maintain uniform tension therein and to preserve the traction drive when the machine is adjusted to varied ratios of speed of drive.

Another object is to provide means in a machine of the type referred to in the foregoing wherein the belts which are at each side of the machine are fastened at one of their ends to rolls on angularly adjustable yokes so that by rotation of the yokes, tension or pulling forces can be exerted on the belts so that inward pressure is exerted on the grooved pulleys so as to adjust them inwardly against tensioning springs whereby to thus adjust the speed ratio of the machine.

Another object is to provide rolls to which the belts are attached at their ends and additional movably mounted rolls cooperating with the belts so as to provide for uniform tensioning or pulling forces on the belts.

Another object is to provide coupling means between rolls on the same side of the machine whereby to equalize pulling forces exerted on the belts.

Another object is to provide coupling means coupling movably mounted rolls that are on opposite sides of the machine whereby to provide for leveling or making uniform the tensioning of belts both on the same side of the machine and as between belts on opposite sides of the machine.

A further object is to realize equalization of tension in all belts by cascading the tension between belts; i.e., by coupling two belts; then providing an equalizing coupling between these two belts and two corresponding belts; and then providing equalizing coupling between the four belts and four corresponding belts.

Further objects and additional advantages of the invention will become apparent from the following detailed description and annexed drawings wherein:

FIG. 13 is a sectional view taken along the line 13—13 of FIG. 4;

FIG. 14 is a sectional view taken along the line 14—14 of FIG. 13;

FIG. 15 is a sectional view taken along the line 15—15 of FIG. 13; and

FIG. 16 is a sectional view taken along line 16—16 of FIG. 13;

The construction of the machine will best be understood by first outlining the general orientation of the various components and assemblies and the order in which they will be described and referred to herein.

GENERAL ORGANIZATION OF THE MACHINE

Figure 1:
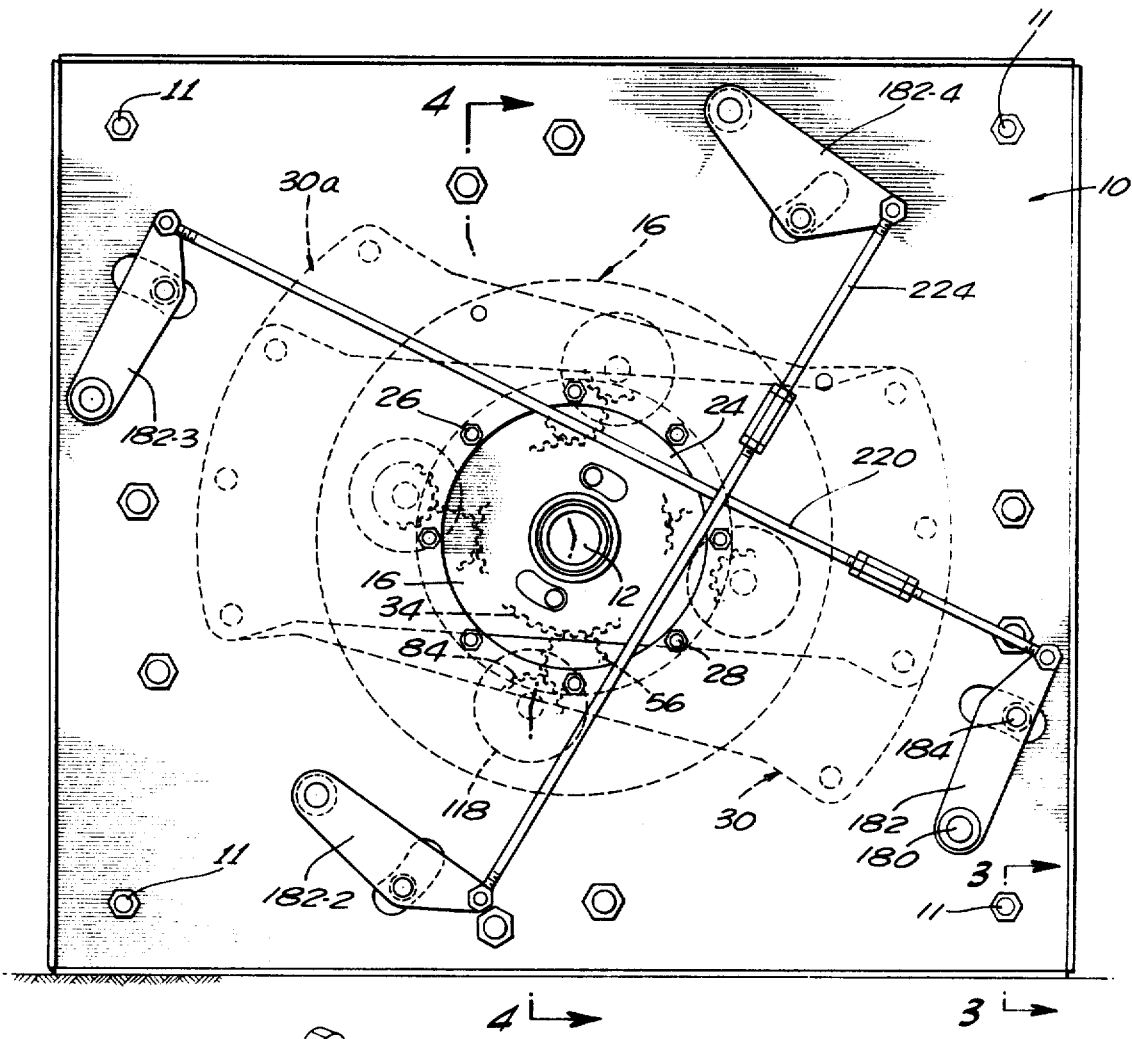
FIG. 1 is a front side view of a preferred embodiment of the invention.

FIG. 1 is a front side view of the machine, showing front side plate 10 and the end of the input shaft 12. This figure shows two of the tie rods linked between mechanisms that hold and control certain of the rolls associated with the belts for maintaining tension as will be referred to more in detail presently.

Figures 2, 3:
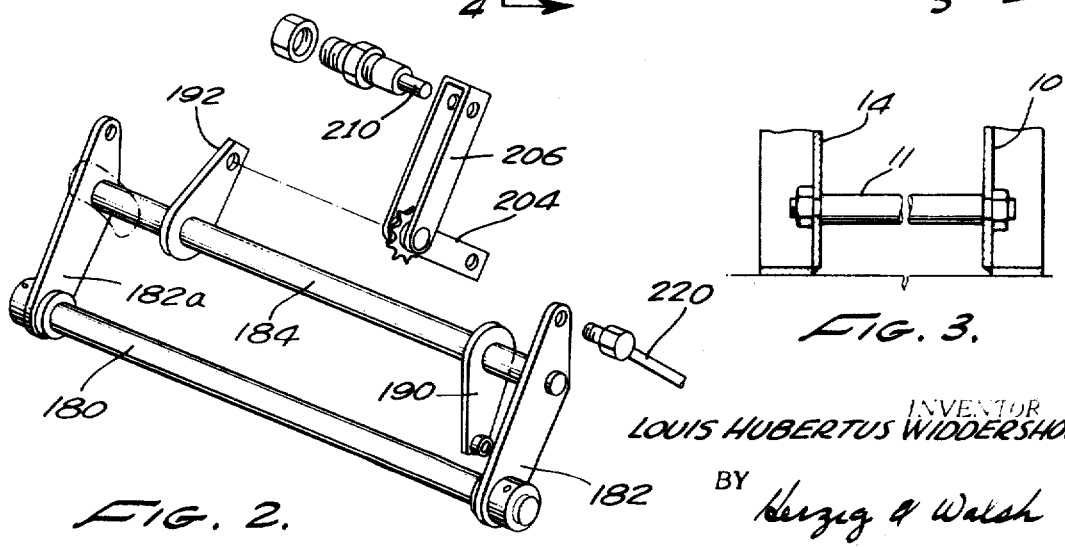
FIG. 2 is a detail perspective view of parts of coupling linkages connected between certain of the rolls for maintaining and equalizing tension in the belts.
FIG. 3 is a sectional view taken along the line 3—3 of FIG. 1.

FIG. 3 shows one of the tie rods 11 between plates 10 and 14.

Figure 4:
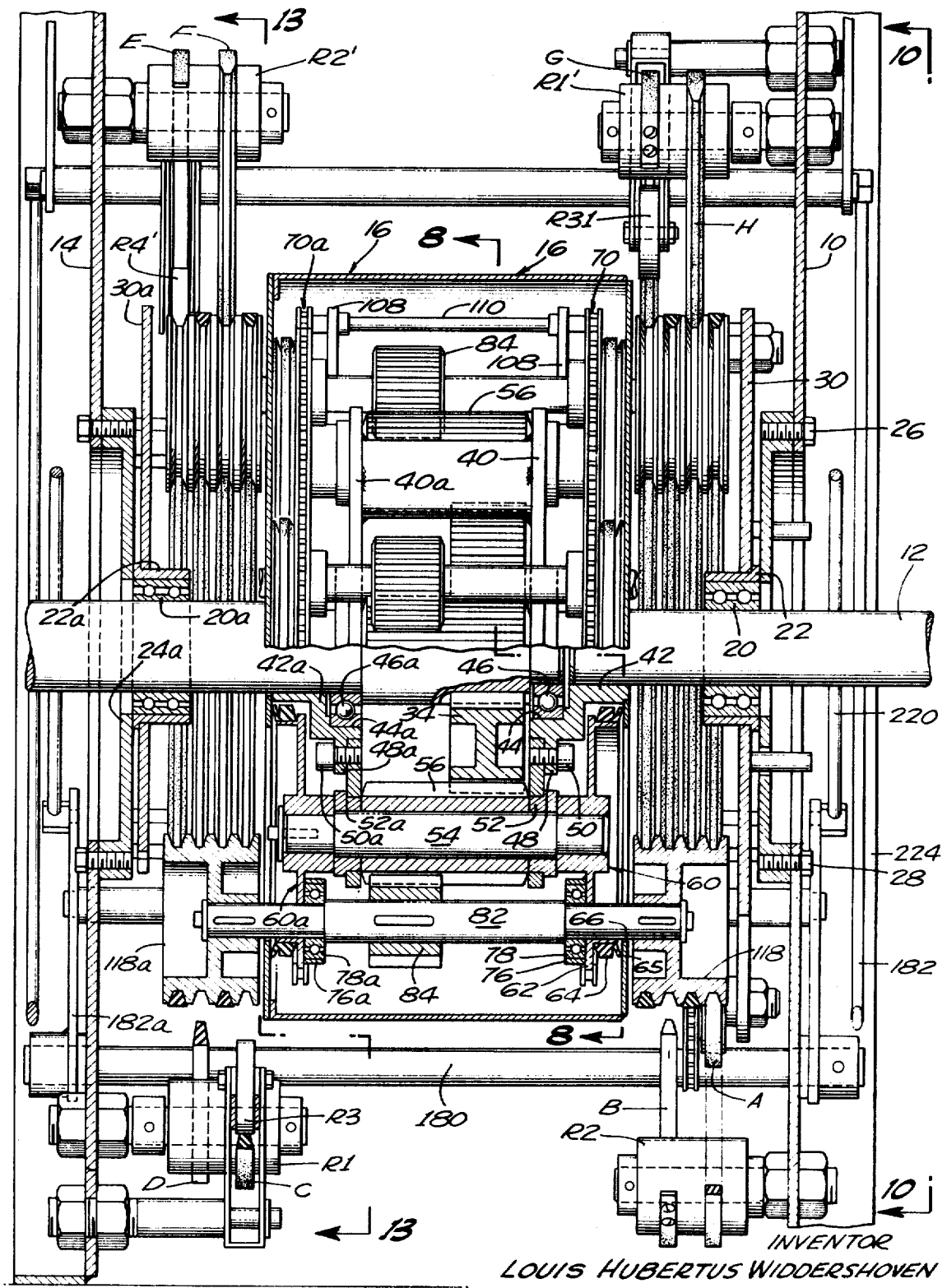
FIG. 4 is a sectional view of the machine taken along the line 4—4 of FIG. 1.

FIG. 4 is a sectional view which includes a section through the rotating drum 16 within which is the planetary system. FIG. 4 shows the front and rear side plates 10 and 14, as well as the input shaft 12 and the output shaft 18. On FIG. 4 may also be observed the two sets of four multiple grooved pulleys on the ends of the shafts of the planetary gears. On this figure may also be seen the various belts that have tractive engagement with the grooved pulleys and which are attached at their ends to rolls, as may be seen at the corners of FIG. 4.

FIGS. 5 through 9 are views in more detail of the planetary system itself.

FIGS. 10 through 16 are views related to FIG. 4 which illustrate the system of belts that engage with the traction pulleys, the fastening of the ends of the belts, and the rolls for maintaining tension in them.

The planetary system will be described first; then the drive of the grooved pulleys; and then the cascaded couplings between belts to maintain equalized and uniform tension in all belts.

THE PLANETARY SYSTEM

The planetary system is at the center of the machine. Reference should be had to FIGS. 4 though 9. Referring to FIG. 4, the input shaft 12 is journalled in bearing 20 carried in a bearing housing 22 at the center of the hub member 24 which is attached to the front side plate 10 by screws as shown at 26 and 28. Numerals 30 and 30a designate a pair of yokes rotatably journalled on the bearing housings 22 and 22a which will be referred to more in detail presently. (Numerals including the letter a are typically counterparts on the rear side of the machine of parts already described on the front side. The "sides" are referred to herein as front, rear, left, and right.)

The input shaft 12 drives the drum 16 and the planetary system within it. On the output shaft 18 is a sun gear 34. The input shaft 12 drives an assembly of four equally angularly spaced shafts having idler gears on them with discs on the ends of these shafts, as will be described. This assembly comprises a pair of circular plates 40 and 40a, as may be seen in FIGS. 4, 5, and 8. Numerals 42 and 42a designate hub members as shown, the member 42 being secured to the input shaft 12. The member 42 has a counter bore 44, and the member 42 has a counter bore 44a; and received in these counter bores are bearings 46 and 46a, the bearing 46 journalling the input shaft 12, and the bearing 46a journalling the output shaft 18.

The members 42 and 42a have extending flanges as shown at 48 and 48a, which are attached by screws 50 and 50a to the circular plates 40 and 40a. These plates are apertured to receive and carry bearing members as shown at 52 and 52a, and in which is journalled one of the disc shafts 54. Mounted on this shaft is the relatively long idler gear 56. There are four of the shafts 54 and idler gears 56 which are equally spaced from each other. Since they are alike and similarly mounted, they need not be separately described. (see FIG. 5).

Mounted on the ends of the shaft 54 are the disc wheels 60 and 60a. Referring to the wheel 60, it will be observed that it has a hub journalled on the end of shaft 54, and it has a part of larger diameter with an extending flange 62 adjacent which is a flexible rubber sealing belt 64, having an extending edge part 65 as shown, which seals against the interior side wall of the drum 16 adjacent opening 66 in the drum.

There are four wheels like the wheel 60 on each side of the system within the drum 16, and since they are all alike, they need not be described in detail. The flexible sealing belts 64 sealing the openings in the drum 16 make it possible for the gear mechanisms within the drum 16 to operate in an oil bath which is sealed in (see FIG. 5).

Numeral 70 designates a link chain which passes over all the wheels 60 on one side of the machine engaging the flanges 62 on these wheels, there being a similar chain 70a on the other side of the machine, these chains serving to insure that all of the wheels 60 and 60a when rotated move synchronously. The chains are secured to the wheels as shown at 71 in FIG. 8.

Referring again to the wheel 60, adjacent its periphery, it carries bearing mounting or holder 76 in which is bearing 78. The wheel 60a carries a similar bearing holder 76a and bearing 78a. Journalled in he bearings 78 and 78a is a shaft 82, and on this shaft is planetary gear 84 which meshes with gear 56 which, as previously described, meshes with the sun gear 34. There are four of the shafts 82 and planetary gears 84 equally spaced apart and extending between disc wheels on opposite sides of the drum 16, and since they are all alike, they need not be described in detail. The flange 62 on wheel 60 does not extend all the way around the wheel, as may be observed in FIG. 8, but has a limited angular extent, so that two square radial shoulders are formed, as shown at 90 and 92, which cooperate with stop members 94 and 96, which limit the amount of angular rotation of the wheel 60 (see FIGS. 5, 6, 7, and 8). Each of the corresponding wheels is limited in its angular rotation by similar stop members. Each of the disc wheels, such as the wheel 60 and the wheel 60a, is biased in one direction by a coil spring, such as the spring shown at 102 in FIG. 9. One end of the spring is connected to a pin 103a on the wheel 60a, and the other end is connected to an end part 104 of transverse shaft 110 extending between the ends of the drum 16, there being four of these shafts associated with the disc wheels. Shaft 110 is supported by bracket 108. The plates 40 and 40a are provided with angular grooves or cutouts, one of which is shown at 112, which allows the shafts as designated at 82 to be moved eccentrically in toward the center line of the input and output shafts.

Carried on the ends of the shaft 82 are the multiple grooved pulleys 118 and 118a. As may be seen, each of these pulleys has a center hub carried on the ends of the shaft, and each has a plurality, that is, four circumferential grooves, to receive traction belts, as will be described. There are four of the pulleys like the pulley 118 on the ends of the shafts like the shaft 82, that is, there is a set of four pulleys on each side of the drum 16. As will be understood, the drum 16, the planetary system within it, and all of the grooved pulleys are caused to rotate or orbit, being driven by the input shaft 12. As will be described, all of the pulleys like the pulleys 118, are driven around their own centers by reason of their frictional traction engagement with the belts engaged with the grooves in the pulleys. These pulleys being driven, drive the shafts like the shaft 82 and gears 84 which drive their respective idler gears 56 which in turn drive the sun gear 34 at a speed which depends on the radial distance of the grooved pulleys outwardly from the center line of the input and output shafts. The relative positions of the two sets of pulleys can readily be observed in FIG. 5.

Figure 6:
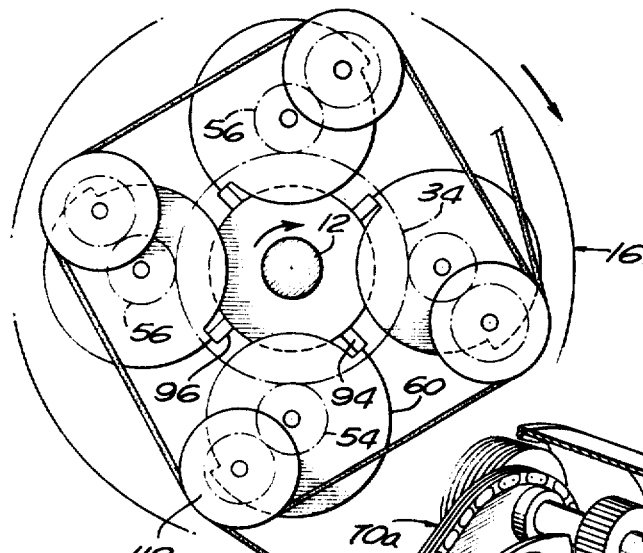
FIGS. 6 and 7 are diagrammatic views illustrating the two extreme positions of the eccentric discs which carry the shafts of the drive pulleys.
Figure 5:
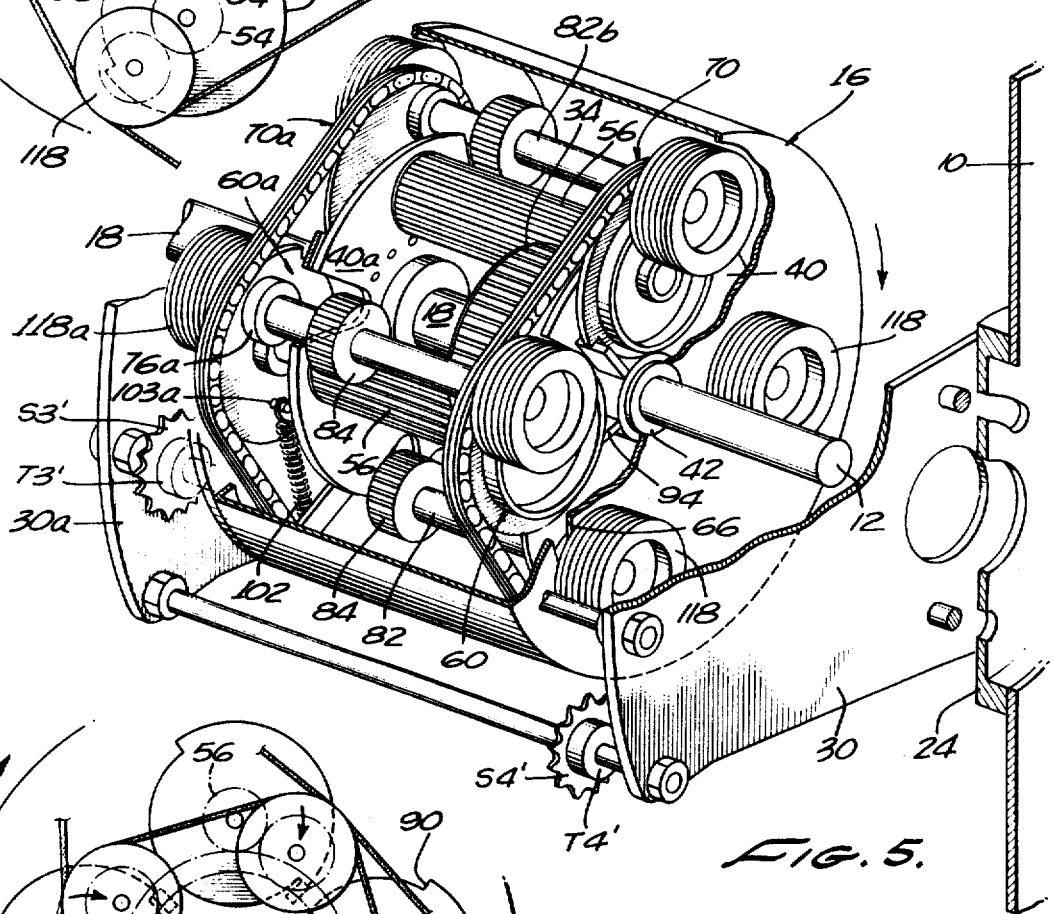
FIG. 5 is a perspective view partly broken away of the planetary system of the invention.
Figure 7:
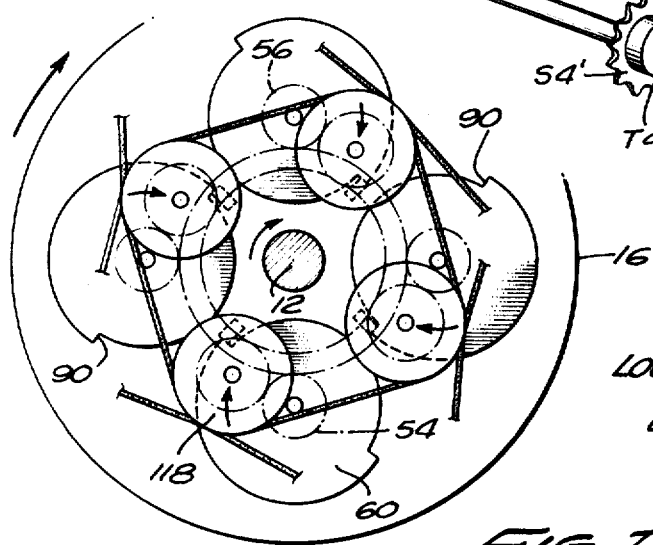
Figure 8:
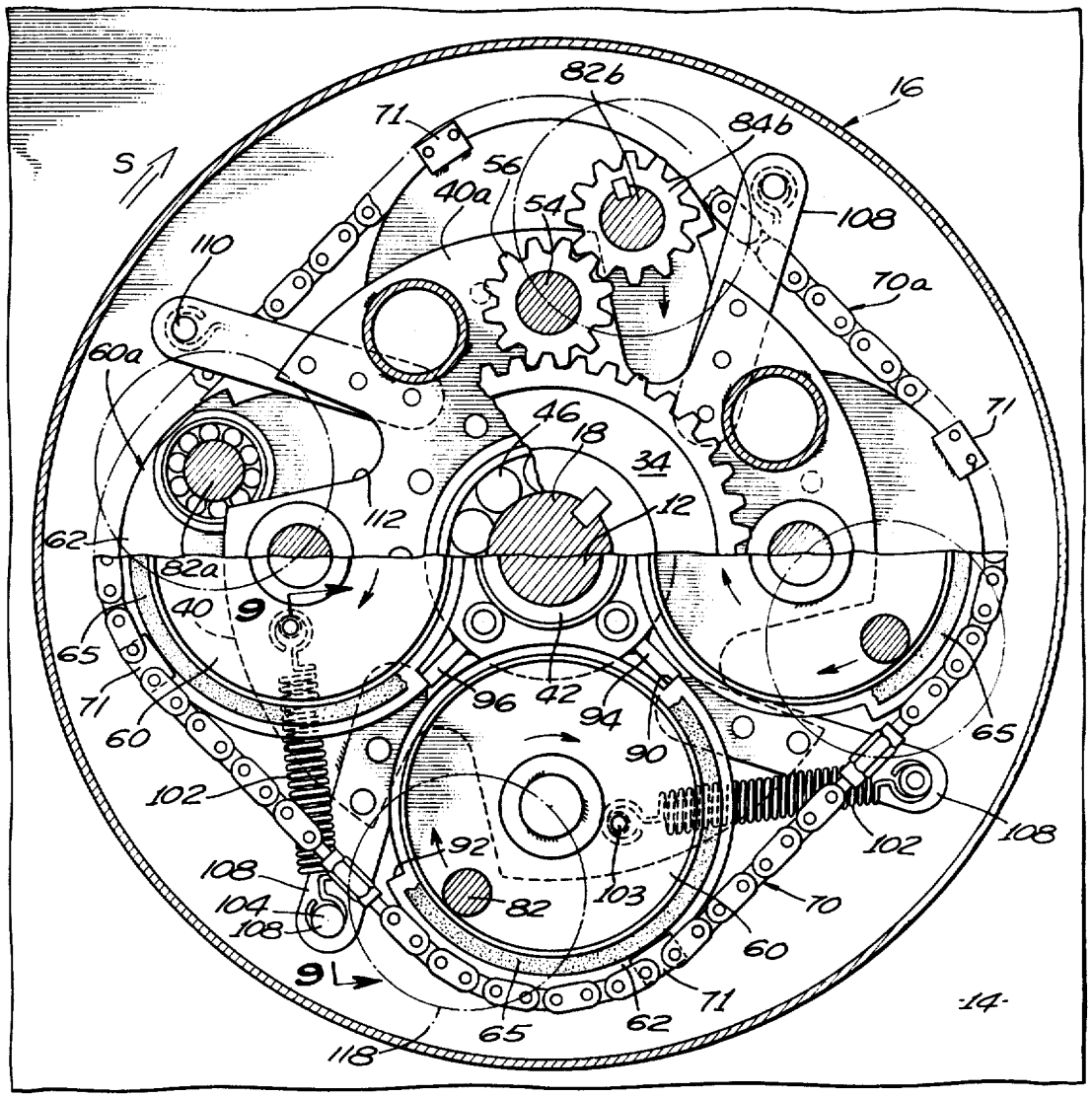
FIG. 8 is a sectional view taken along the line 8—8 of FIG. 4.
Figure 9:
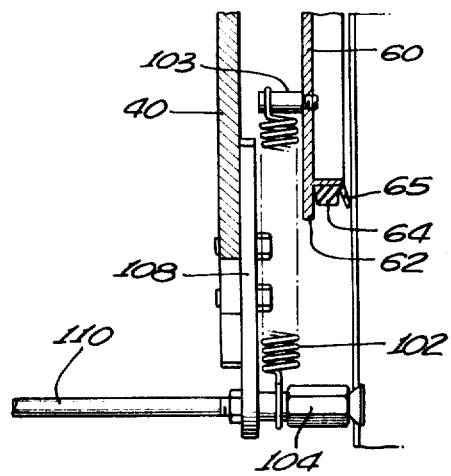
FIG. 9 is a sectional view taken along the line 9—9 of FIG. 8.

FIGS. 6 and 7 are diagrammatic views which illustrate the two limiting or extreme positions of rotation of the disc wheels such as the wheel 60. All of these wheels are similarly limited in angular rotation by limit stops as described in connection with FIG. 5.

FIG. 6 illustrates the maximum outward radial position of the shafts such as 82 and the respective planetary gears and grooved pulleys, whereas FIG. 7 illustrates the limiting inward radial position of these shafts and grooved pulleys. As will readily be understood, as the grooved pulleys are moved farther out from the center line of the input and output shafts as they travel in their orbits, they make more revolutions about their own axes as a result of tractional engagement with the belts, and thus drive the output shaft at a higher speed, whereas when the pulleys are moved inwardly, the output shaft is driven at a lower speed.

TRACTION DRIVE OF THE GROOVED PULLEYS AND MANNER OF ADJUSTMENT OF THE SPEED RATIO

Figure 10:
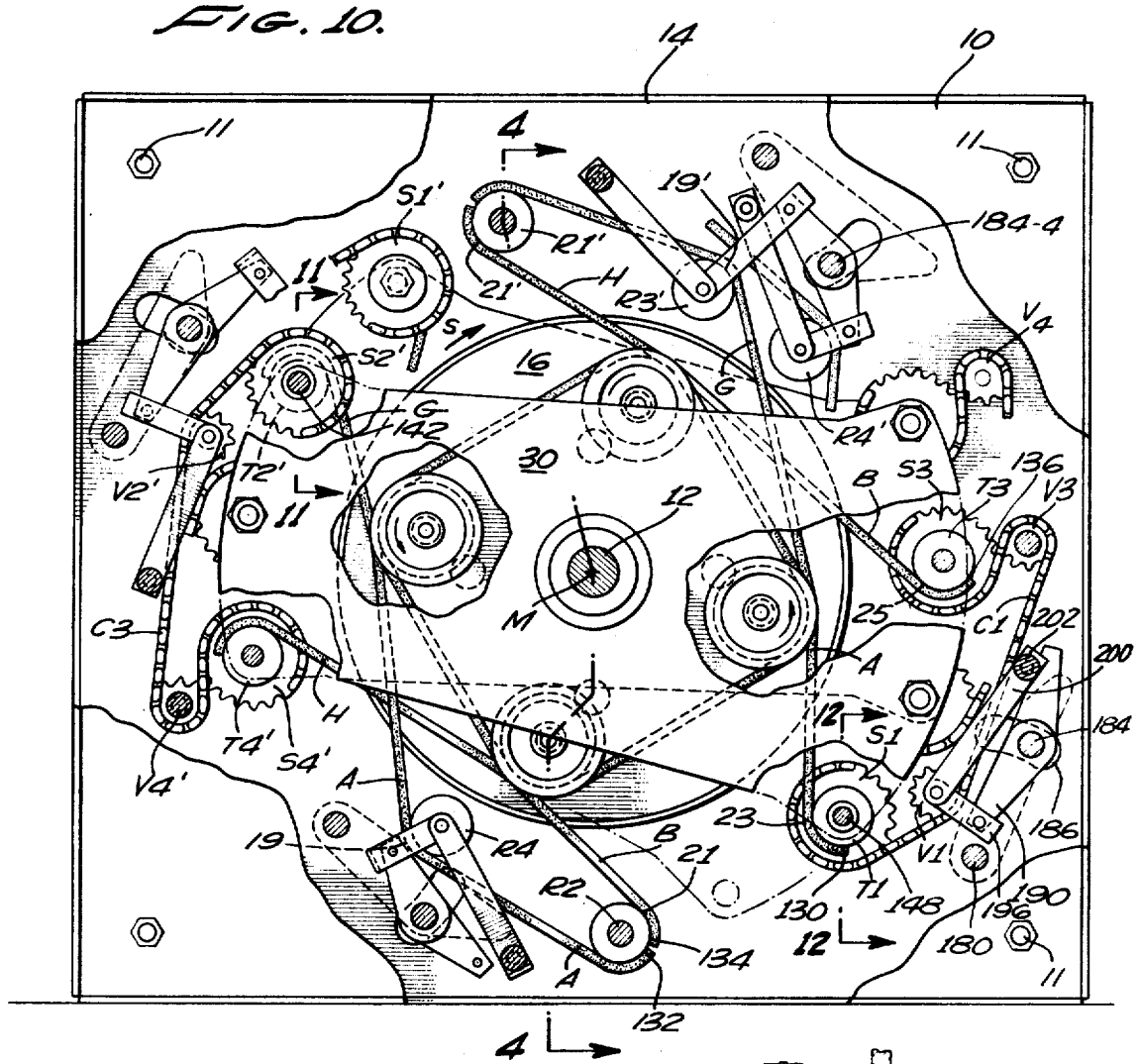
FIG. 10 is a sectional view taken along the line 10—10 of FIG. 4.

The yokes 30 and 30a previously described are mounted to rotate about the input and output shafts 12 and 18, as may be seen in FIGS. 4, 10, and 13. Rotatably mounted on the yokes are two groups of four end pulleys or rolls T1, T2, T3, T4, and T1', T2', T3', and T4'. The pulleys T1 and T3 are at one end of the yoke 30, and the pulleys T1' and T3' are at the other end of the yoke 30a. End rolls T2 and T4 are at the corresponding end of yoke 30a, and end rolls T2' and T4' are at the end of yoke 30 opposite rolls T1 and T3 (see FIGS. 10 and 13). There are also two groups of tension rolls, R1, R2, R3, R4, and R1', R2', R3', and R'. Four of these rolls R2, R4, R1', and R3' are at the inside of front plate 10 (see FIG. 10). As may be seen in FIGS. 4 and 10, they cooperate with belts that engage the grooved pulleys on one side of the drum 16. The other four rolls R1, R3, R2', and R4' are in corresponding positions on the other side of the machine (see FIG. 13).

Four flexible belts are used around each set of grooved pulleys for leveling or making uniform the speed of rotation of each set which would otherwise not be uniform without a plurality of spanning belts.

The belts on the front side of the machine are shown in FIG. 10. Belt A has its end fastened to the end pulley T1 at 130, and it runs over three grooved pulleys; over the tension roll R4 to the tension roll R2; the end of this rope being fastened to the said tension roll R2 at 132. Belt B fastened at 134 at its end to the tension roll R2; runs over three belt pulleys to the end pulley T3, and the end of said belt B being fastened to the said end pulley T3 at 136. The course of the two belts C and D on the other side is similar, as shown on FIG. 13. Also, the course of the belts H, G, E, and F which cooperate with the groups of tension rolls R1', R3' and R2' and R4', and the groups of end pulleys T1' through T4' associated with these belts needs no further explanation. These courses are similar to those of the belts A, B, C, and D. Belts C, D, E, and F are shown in FIG. 13 cooperating with grooved pulleys and end rolls on that side of the machine, whereas belts A, B, G, and H cooperate with end pulleys and tension rolls on the other side of the machine, i.e., the front side as seen in FIG. 10.

In connection with the leveling of the different rotation speeds of the belt pulleys, which is one of the objects of the invention, the place of positioning of the tension rolls R1 through R4, R1' through R4', respectively, and of the end pulleys T1 through T4, T1' through T4', respectively, is not chosen arbitrarily. It has been determined that the various positions of the parts on the belt pulleys spanned around by the belts coming from the tension rolls, the end pulleys respectively effect this leveling. The particular mutual position of the tension rolls R4 and R2 and of the end pulleys T1 and T3 provides for the first leveling. For this position is determined by the rising points of the ropes A and B and on the tension rolls R4 and R2 on the end pulleys T1 and T2 respectively. According to the invention, the angle made by the lines going through the center M of the device and through the rising points 19 and 21, and 19' and 21' of the tension rolls R4 and R2 and R4' and R2', through the rising points 23 and 25 and 23' and 25' of the end pulleys T1 and T3, and T1' and T3', respectively, should be 45°.

For second leveling, the angle made by the lines going through the center M and the corresponding rising points of the tension rolls R3 and R1 and R3' and R1' and the corresponding rising points of the end pulleys T2 and T4 and T2' and T4', respectively, should also be 45°, and said angle should half overlap the first mentioned angle of 45° as appears clearly from the figures.

For a final leveling serves the particular position of the group of tension rolls R1 through R4 in respect of the group of tension rolls R1' through R4', the group of tension rolls R1' through R4' leading 11° and 15 minutes in respect to the group of tension rolls R1 though R4.

For varying the speed ratio between the input shaft and the output shaft, the yokes 30 and 30a carrying the end pulleys T1 through T4 and T1' through T4' respectively mounted thereon are rotated in accordance with the arrow S around center M. This exerts pulling force in all belts which acting on the grooved pulleys forces them inwardly, that is, to rotate wheels 60 against the force of their biasing springs to move the grooved pulleys inwardly toward the center line of the shafts. The yokes can be set in any desired position by means, not shown, such as a hand lever that can be set in any position.

When the yokes are rotated according to the arrow direction S, the pulleys will carry out an anti-clockwise rotation around their own centers as a result of the coupling between said end pulleys. By this means, on various belts A through H, a tensile motion is carried out. As a result thereof, the belt pulleys rotate anti-clockwisely inwardly, the discs 60 on which the bearings on the belts pulleys are mounted also carrying out an anti-clockwise rotation. Since the discs 60 are mutually coupled by means of the chains 70, the rotation of all discs 60 will be the same.

Figure 11:
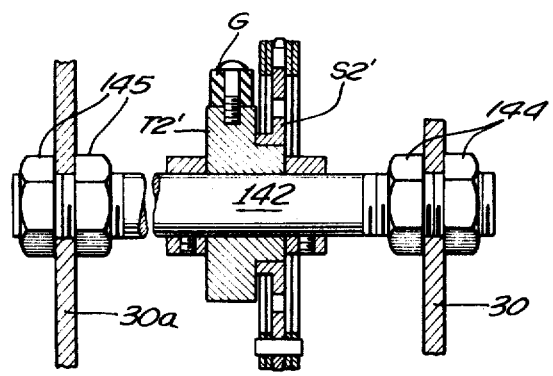
FIG. 11 is a sectional view taken along the line 11—11 of FIG. 10.
Figure 12:
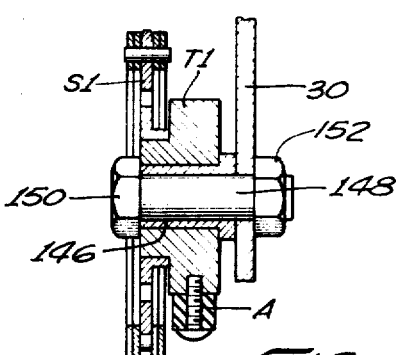
FIG. 12 is a sectional view taken along the line 12—12 of FIG. 10.

Referring to the end rollers T1 through T4 and T1' through T4', each has a hub on which is mounted a sprocket wheel or roller identified by the characters S1 through S4 and S1' through S4'. FIG. 11 is a cross sectional view of the roller T2' having sprocket roller S2' on its hub as shown. The roll T2' and sprocket roller S2' are on a transverse shaft 142, the opposite ends of which are threaded and which are secured to the two spaced yokes 30 and 30a by way of nuts 144 at one end and 145 at the other end. It will be observed that the shaft 142 and corresponding shafts attach yokes 30 and 30a together so that they move together.

Referring to the tension roll T1, it is shown in cross section in FIG. 11. Mounted on its hub is sprocket roller S1. The tension roll T1 and sprocket roller S1 are journalled on a bushing 146 on a stub shaft 148 extending from the yoke 30, the stub shaft being in the form of a bolt having a head 150 and a nut 152 at its end. It will be understood that the yokes 30 and 30a are secured to each other with an angular displacement which may be seen in FIG. 10 being attached to each other by transverse shafts like the shaft 142 at corner positions where the yokes are in overlapping relationship. The tension roll T1 and sprocket roller S1 and its diametrically opposite counterpart are mounted as shown and described in connection with FIG. 12. The counterpart of these rollers on the yoke 30a are identified as the roll T1' and sprocket roller S1' in FIG. 14 which is a mirror image as may be seen, of FIG. 12.

In order to keep the various belts all stretched to each system of end pulleys T1 through T4 and T1' through T4', respectively, an additional system of rolls in the form of sprocket rolls V1 through V4 and V1' through V4, respectively, is provided.

Having reference to the rolls V1 through V4 and V1' through V4', the rolls V3 and V4 and V3' and V4' are rigidly mounted whereas the rolls V1 and V2 and V1' and V2' are movably mounted. FIG. 15 is a cross sectional view showing the mounting of one of these rolls V4. It is mounted on a shaft 160 extending from a threaded stem 162 which is secured to the rear plate 14 by nuts as shown at 164. The other rolls in the V series that are fixedly mounted are mounted in a similar way, to either plate 10 or plate 14.

The rolls V1, V2 and V1' and V2' are movably mounted as may be seen on FIGS. 10 and 13. These rollers will be referred to again presently.

Referring to the tension rollers R of this series, R2 and R1' and R1 and R2' are fixedly mounted whereas R4 and R3' and R3 and R4' are movably mounted.

FIG. 16 is a cross sectional view illustrating the mounting of tension roll R1 showing the attachment of one of the flexible belts to it. The flexible belts are cross sectioned to fit into the grooves on the pulleys, being flat on the inside at their ends for attachment to the rollers as illustrated in FIG. 16. The roller R1 is on a shaft 170 which is threaded at its end and is secured to the plate 14 by way of nuts as shown at 172.

The sprocket rollers S1 and S3 are coupled together by a link chain C1 as may be seen in FIg. 10, the ends of which are attached to these respective sprocket rollers as shown and this chain passing over the rolls V1 and V3. There are four coupling chains C1 through C4 which couple tension rolls similarly. The purpose of these coupling chains will be readily apparent to those skilled in the art. When the yokes 30 and 30a are rotated in the direction of the arrow S, it will be observed that a pulling force is exerted on all of the belts A, B, C, and D and the belts E. F. G, and H. Having reference to the coupling chain C1, it will be observed that when the yokes are rotated, a pull is exerted on it which is transmitted from roller S1 to the sprocket roller S3 so that the pulling force on belts A and B is equalized, similarly, the pulling force as between belts C and D is equalized; that between belts E and F is equalized; and that between G and H is equalized. Furthermore, the equalizing pulling force or tension in belts A and B is coupled to the other side of the machine to the equalized tension in belts C and D in cascade fashion. The tension equalizing coupling means for the chains C1 and C2 is illustrated by FIG. 2 on the first sheet of drawings. Numeral 180 designates a shaft extending between the front and rear plates 10 and 12. On this shaft, there are extending arms 182 and 182a and extending between these arms is a rod or shaft 184 which can swing in arcuate slots 186 in plate 10 and 186a in plate 14. On the shaft 184 is an arm 190 having a direction as may be observed in FIG. 10. On the shaft 184 is another extending arm 192 extending in a direction as may be seen in FIG. 13. At the end of arm 190, is a link 196 as may be seen in FIg. 10 which is pivotally attached to another link 200, sprocket roll V1 being pivotally mounted at the point of attachment. The other end of link 200 is mounted on a transverse cross shaft 202.

The arm 192 as may be seen in FIGS. 2 and 13 is pivotally attached to a double link 204 the end of which is pivotally attached to another link 206 and at the point of attachment is journalled the tension sprocket roller V2. The other end of link 206 is journalled on a transverse shaft 210. From the foregoing, it may be observed that tensions exerted by chains C1 and C2 on the tension rollers V1 and V2 tends to swing the shaft 184 in opposite directions, that is, in opposite directions around the shaft 180. Thus, the tensions are equalized between these chains associated with the two yokes. It will be observed that arms 190 and 192 extend substantially oppositely from shaft 184. Links 200 and 206 extend in reversed directions from corresponding links 196 and 204, these assemblies otherwise being alike.

The mechanical arrangements for equalizing tensions with respect to belts E, F, G, and H as between chains C3 and C4 are similar and therefore need not be described in detail.

The tension rolls R4 and R4' and R3 and R3' are mounted in ways that correspond to the mounting of the rollers V1, V2, V1', and V2', respectively. These mountings corresponding to the detailed description relative to rollers V1 and V2 and as illustrated in FIG. 2, further description is not necessary. As may be observed from FIGS. 10 and 13, the tension roller R4 being coupled across the machine to roller R3 serves additional to equalize tensions as between belts A, B, and C, D. Similarly, tension rollers R3' and R4' serve to equalize tensions as between belts E and F and belts G and H. FIG. 10 shows the coupling across the machine between rollers R3' and R4' by way of shaft 184–4.

As may be observed in FIG. 1, four of the arms like arm 182 are shown identified at 182, 182-2, 182-3, and 182-4. Arms 182 and 182-3 are tied together by a tie rod 220 with a turn buckle in it, and the arms 182-2 and 182-4 are tied together by another tie rod 224 with a turn buckle in it. The corresponding arms on the opposite side, that is, the rear side of the machine are tied together by similar tie rods. The cascading of the tension equalizing means may be illustrated as follows: Belts A and B are coupled to equalize tension. These two belts are coupled in cascade across the machine to coupled belts C and D. Then, these four belts are coupled in cascade diametrically by tie rods to the four cascaded belts E, F, G, and H. Two such multiple couplings through tie rods is provided.

OPERATION

The operation of the machine will be readily understood by those skilled in the art. The input shaft 12 may be driven by any suitable means at a desired speed. The output shaft 18 is driven through the mechanism of the machine at a speed determined by the adjustment or setting of the machine. That is, the speed ratio is determined by the machine setting. The input shaft 12 drives the drum 16 and the planetary system as described in the foregoing, the grooved pulleys moving in an orbit.

The grooved drive pulleys, like the pulley 60, having tractive engagement with the belts wrapped or spanning around them as described, are driven around their axes, and these gears through the idler gears 54 drive the sun gear 34 and the output shaft 18.

To adjust the speed ratio, the yokes 30 and 30a are rotated in the direction S about the axes of the input and output shafts. This may be done by any convenient means, such as a manually actuable and settable speed changing lever. The yokes on opposite side of the machine exert pulling forces on all of the belts, that is, the four sets of belts on each side of the machine. The pulling forces on the belts acting on the grooved pulleys exerts an inward force on them, causing all of the disc wheels like 60 to rotate about their axes, so that the eccentric positions of the shafts 82 of the planetary gears are rotated inwardly to reduce the radius of orbit of the grooved pulleys. The movement of the eccentric disc wheels is against the forces of the biasing springs acting on them. The yokes can be set in the adjusted position. When the grooved pulleys are thus moved inwardly, the output shaft 18 is driven at a lesser speed, since the grooved pulleys now travel through reduced orbits, and thus have tractive engagement with lesser lengths of belt in a single orbit so that they make fewer revolutions about their own axes.

The forces exerted on all of the belts on each side of the machine are equalized. This is accomplished by the flexible interconnections between tension rolls on the yokes on each side of the machine as previously described, and by the cascaded intercoupling between rolls on opposite sides of the machine and as provided by the tie rods as previously described.

What is claimed is:

1. A steplessly variable speed transmission adapted to be interposed between an input shaft and output shaft comprising in combination, a sun gear on an output shaft, a planetary system driven by the input shaft comprising means rotatable about the input shaft and at least one planetary rotor means carried by said first means which is driven in orbit, means whereby the planetary rotor means drive the sun gear, traction means engageable with a rotor forming part of the planetary rotor means whereby the said rotor is driven around its axis during orbit, whereby to drive the sun gear, and means cooperating with the traction means for holding said rotor in predetermined adjustable orbits.

2. A device as in claim 1, wherein said traction means comprising flexible means, said one rotor having tractive engagement with the flexible means.

3. A device as in claim 2 having means to adjust said one rotor of the planetary rotor means toward and away from the input shaft to vary the ratio of speed transmission.

4. A device as in claim 2, wherein said planetary rotor means comprises a plurality of angularly spaced rotors, said flexible means having tractive engagement with all of said rotors.

5. A device as in claim 3, wherein said planetary rotor means comprises wheel means having mounting means whereby to be rotated in orbit about the input shaft, means mounting said one rotor to be eccentrically carried by said wheel means, so that by rotation of the wheel means the said rotor is adjusted toward and away from the center line of the input shaft.

6. A device as in claim 5 comprising a plurality of said wheel means having shafts eccentrically carried thereby, said planetary rotor means comprising a plurality of rotors, the said planetary rotors being mounted on said shafts.

7. A device as in claim 4 said flexible means being fastened at an end part thereof.

8. A device as in claim 4, said planetary rotor means comprising a plurality of planetary shafts, said plurality of rotors comprising equally spaced rotors mounted on both ends of the shafts.

9. A device as in claim 8 comprising flexible means engaging groups of rotors at one end of the shafts and flexible means engaging rotors at the other ends of the shafts.

10. A steplessly variable speed transmission adapted to be interposed between an input shaft and output shaft comprising in combination, a sun gear on an output shaft, a planetary system driven by the input shaft comprising at least one planetary rotor means which is driven in orbit, means whereby the planetary rotor means drive the sun gear, and traction means engageable with the planetary rotor means whereby the planetary rotor means is driven around its axis during orbit, said traction means comprising flexible belt means having frictional engagement with the rotor means, said planetary rotor means comprising a plurality of rotors, said flexible belt means having engagement with all of the rotors, a plurality of planetary shafts, said plurality of rotors comprising equally spaced rotors mounted on both ends of the shafts, flexible belt means engaging groups of rotors at one end of the shafts and flexible belt means engaging rotors at the other ends of the shafts, means having fixed mounting to which the belts are secured at one end, angularly movable yoke means to which the belts are secured at the opposite ends such that by angularly moving the yoke means, pulling forces can be exerted on the belts whereby to adjust the radial position of the rotors for adjusting the speed ratio, the said rotors being in the form of grooved pulleys.

11. A device as in claim 9 including means providing coupling between belts having engagement with the same pulleys for equalizing pulling forces exerted on the belts when the yoke means are moved angularly.

12. A device as in claim 10 including movable idlers rollers having engagement with a belt on one side of the machine, further movable idler rollers having engagement with a belt on the opposite side of the machine, and means providing coupling between respective rollers on opposite sides of the machine whereby tension is equalized as between belts having engagement with the said respective rollers.

13. A device as in claim 12, including a pair of said coupling means disposed substantially diametrically opposite each other and further cascaded coupling means providing coupling between the said pairs of coupling means.

14. A device in claim 11, including movable idlers rolls having engagement with a belt on a front side of the machine, further movable idlers rolls having engagement with a belt on a rear side of the machine, means providing coupling between respective rolls on front and rear sides of the machine whereby tension is equalized as between two belts on a same side of the machine; and as between pair os belts on front and rear sides of the machine; additional diametrically disposed corresponding belts; and further coupling means providing additional cascaded equalizing coupling between groups of four belts on left and rights sides of the machine.

15. A device as in claim 5 including means for tensioning the flexible means whereby to cause the rotor to be moved toward the center line of the input shaft to vary the speed ratio.

16. A device as in claim 10 including the biasing means biasing said rotor oppositively to the force exerted by the flexible means.

17. A device as in claim 6, all of said rotors actively engaging said flexible means and means for tensioning the flexible means to cause the rotors to move toward the center line of the input shaft to vary the speed ratio.

* * * * *